United States Patent [19]

Iguchi

[11] 4,096,991

[45] Jun. 27, 1978

[54] NOTE DISCRIMINATING APPARATUS

[75] Inventor: Masayuki Iguchi, Himeji, Japan

[73] Assignee: Glory Kogyo Kabushiki Kaisha, Himeji, Japan

[21] Appl. No.: 686,236

[22] Filed: May 13, 1976

[30] Foreign Application Priority Data

| | | |
|---|---|---|
| May 13, 1975 | Japan | 50-56632 |
| May 13, 1975 | Japan | 50-56631 |
| Sep. 18, 1975 | Japan | 50-112957 |

[51] Int. Cl.[2] .......... G06K 13/08; G06F 7/02; G06K 7/08

[52] U.S. Cl. .......... 235/419; 235/480; 235/449

[58] Field of Search .......... 235/61.11 E, 61.11 D, 235/61.7 R, 61.11 K, 61.11 R, 61.6 E, 61.11 F; 340/149 A; 250/568, 566; 194/4 R

[56] References Cited

U.S. PATENT DOCUMENTS

| | | | |
|---|---|---|---|
| 2,922,893 | 1/1960 | Ett | 194/4 R |
| 3,201,569 | 8/1965 | Conron | 235/61.6 E |
| 3,340,978 | 9/1967 | Haville | 194/4 R |
| 3,360,653 | 12/1967 | Phares | 194/4 R |
| 3,480,785 | 11/1969 | Aufderheide | 194/4 R |
| 3,596,063 | 7/1971 | Curtis | 235/61.11 F |
| 3,628,031 | 12/1971 | Azure | 250/568 |
| 3,806,706 | 4/1974 | Hasslinger | 235/61.11 E |

*Primary Examiner*—Robert M. Kilgore
*Attorney, Agent, or Firm*—Wenderoth, Lind & Ponack

[57] ABSTRACT

A note discriminating apparatus includes first and second detectors for detecting the characteristics of a note, a reference level generating section for generating a reference level signal by utilizing the output of the first detector, and a level detecting section for comparing the reference level signal with the outputs of the second detectors to recognize the note. The apparatus further includes a means which, when a note conveyed through the note inlet to the note discrimination position is detected as abnormal, conveys the note back to the note inlet, and conveys the note to the note discrimination position again.

10 Claims, 15 Drawing Figures

NOTE DISCRIMINATING APPARATUS

BACKGROUND OF THE INVENTION

This invention relates to note discriminating apparatuses for operating to recognize whether a note is a true note or a false note or to determine the denomination of a note, and is suitably applicable to equipment such a money exchanging machine, an automatic vending machine, a money depositing machine and a money dispensing machine, which automatically handles a number of bank notes.

A note discriminating apparatus in which a note inserted into the note inlet is conveyed to a predetermined position where it is examined is known in the art. However, it should be realized that the operator of such an apparatus is not always a specialist provided for, or familiar with, the apparatus, that is, in almost all cases the apparatus is operated by a number of persons who are not familiar with the apparatus. Accordingly, the note is not always inserted into the apparatus in a correct or specified manner, that is, the note is often inserted irregularly or obliquely to the note conveying path of the apparatus. In these undesirable cases, the note and the note discriminating section where the note should be examined are not in a suitable positional relationship, which often leads to erroneous discrimination results. Accordingly, in these cases, the note is not conveyed into the money container but is instead returned to the operator.

When such an apparatus is operated by ordinary persons (not specialists), it is important from the view point of improved reliability to reduce the number of operating steps such as a note insertion, required for the operation of the apparatus.

Furthermore, bank notes handled by such a note discriminating apparatus are not always new ones, that is, most of the bank notes are old notes stained, damaged or creased by circulation. Therefore, such old notes are liable to be caught or slip in the note conveying path before they are taken into the money container or stacker. (Such trouble will be referred to as "note trouble" when applicable, hereinafter.)

In the case when such note trouble occurs, it goes without saying that the trouble should be eliminated as soon as possible, because otherwise the note may be torn.

This problem may be solved by employing a method in which, when the note is not conveyed to a predetermined note examining position a predetermined time after the insertion of the note into the apparatus, the note conveying operation is suspended. However, in this case, that is, in the case when the note conveying operation has been suspended, the apparatus must be restored to operation by a special person instead of the user or customer who has inserted the note into the apparatus. Accordingly, the note trouble is not always immediately overcome. This is one of the reasons why such an apparatus is sometimes inconvenient to customers.

However, it has been found that such note trouble can be solved by the method of this invention in which a note caught or slipped is returned to the note inlet, and is then forwarded along the note conveying path again.

On the other hand, optical characteristics, magnetic characteristics, dimensional characteristics, color characteristics, and the like of bank notes are considered as factors for discriminating notes, that is, notes having different denominations have different characteristics. However, as was mentioned above, the note discriminating apparatus must handle not only new bank notes but also old bank notes, and if the notes are observed in detail, they show fluctuations or scatterings in thickness, damage or stain. If these fluctuations become great, it is impossible for the note discriminating apparatus to recognize such notes. Therefore, there is a strong demand for a note discriminating apparatus which can recognize notes even if the notes show great fluctuations in thickness, damage or stain.

SUMMARY OF THE INVENTION

Accordingly, an object of this invention is to provide a note discriminating apparatus in which all of the above-described difficulties or inconveniences accompanying a conventional note discriminating apparatus have been overcome.

More specifically, a first object of the invention is to provide a note discriminating apparatus in which the number of operating steps which should be carried out by a user is less when compared with that in a conventional note discriminating apparatus.

A second object of the invention is to provide a note discriminating apparatus in which if a note conveyed into the apparatus is caught or slips in the note conveying path thereof, the note is conveyed back, and is conveyed into the apparatus again so as to minimize the number of times the apparatus is stopped.

A third object of the invention is to provide a note determination apparatus in which its discrimination is not affected by the fluctuation in characteristics (such as stain, thickness or damage) of the note, thereby to improve the reliability of the apparatus.

The novel features which are considered characteristic of this invention are set forth in the appended claims. This invention, however, as well as other objects and advantages thereof will be best understood by reference to the following detailed description of illustrative embodiments, when read in conjunction with the accompanying drawings.

DETAILED DESCRIPTION OF THE INVENTION

Figure 1:
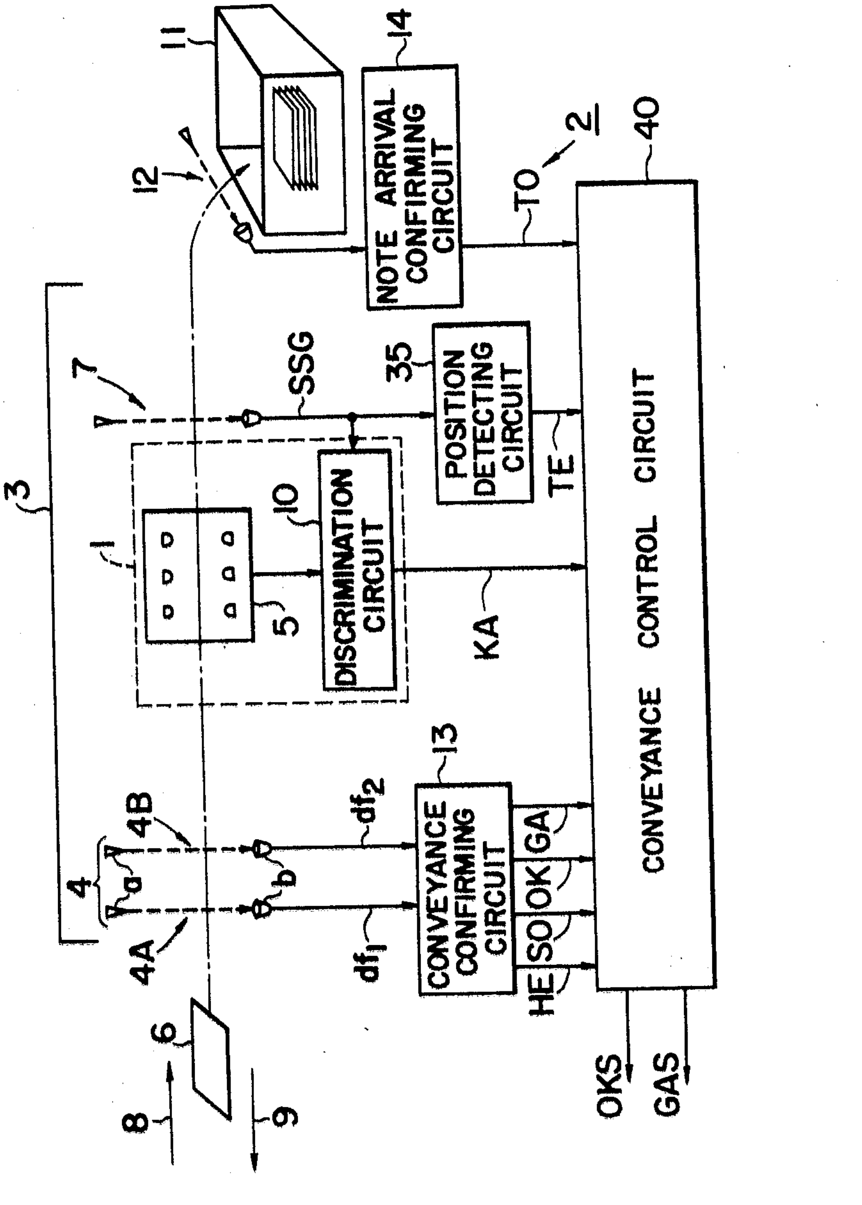
FIG. 1 is a block diagram showing one example of a note discriminating apparatus according to this invention.

One preferred embodiment of the note discriminating apparatus according to this invention, as shown in FIG. 1, comprises a note examining apparatus body 1 and a note conveyance control system 2.

In this example, the note conveyance control system 2 comprises: the feed confirming and re-discrimination starting detector 4 provided in the vicinity of the note inlet (not shown) in the note conveying means 3 constituted, for instance, by an endless belt (which may be referred to as "a note conveying path 3" when applicable); and the predetermined-position confirming detector 7 for detecting the arrival of the note to be examined to the position of the note examining means 5 provided in the note conveying path 3.

This note conveying means 3, is driven by an electric motor (not shown). When the motor is rotated in one direction, the note 6 to be examined is conveyed in the direction of the arrow 8 (hereinafter referred to as "the feed direction" when applicable); and when the motor is rotated in the opposite direction, the note 6 is conveyed in the direction 9 opposite to the feed direction (hereinafter referred to as "the return direction" when applicable).

In connection with this, the term "feed" as used herein is intended to designate that a note is fed into the apparatus through the note inlet toward a money container or stacker, and the term "return" as used herein is intended to mean that a note is returned toward the note inlet.

When the note 6 passes through the note examining means 5, the latter produces a detection signal. Based on this detection signal, a discrimination circuit 10 determines whether or not the note is acceptable for the apparatus, that is, it determines whether the note is a true note or a false note and whether or not the denomination of the note is acceptable, and then produces a discrimination signal KA.

When the note is found acceptable, the note is further conveyed and put into the money container or stacker 11. The note arrival confirming detector 12 is provided for confirming that the note has arrived at and been taken into the stacker 11. That is, the detector 12 produces a detection signal when the note has been taken into the stacker 11. Based on this detection signal, a note arrival confirmating circuit 14 produces a note arrival confirmation signal TO.

Figure 2:
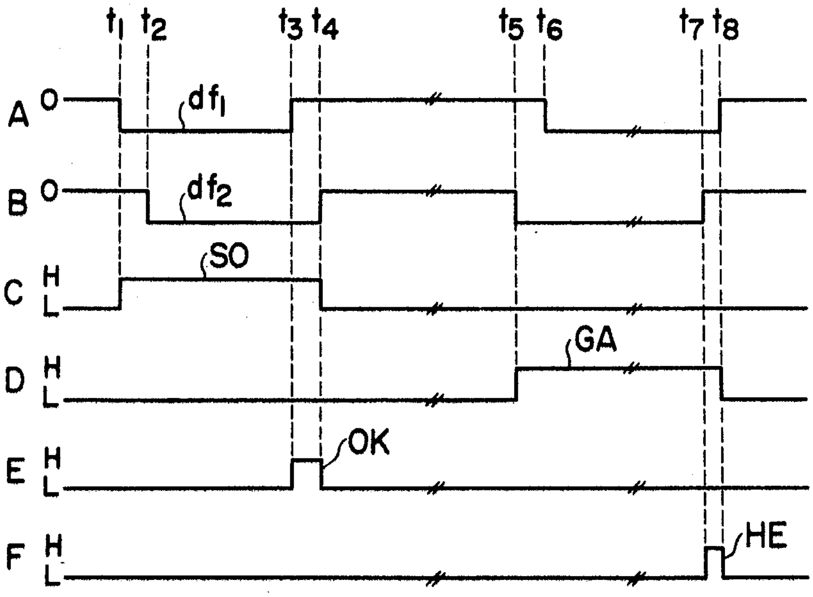
FIG. 2 is a set of waveform graphs indicating various signals employed in the conveyance confirming circuit in the apparatus shown in FIG. 1.

Each detection provided in the note conveying path 3 comprises a light source *a* such as a light emitting diode disposed at one side of the note conveying path 3, and a light receiving element *b* such as a photoelectric transducer provided on the opposite side of the note conveying path 3. As is indicated in A and B of FIG. 2, when the note 6 passes through the detector 4 to intercept the light emitted by the light source *a*, the output of the detector is decreased from the "0" level to a detection level corresponding to the light, transmission quantity of the note.

The detector 4 described above comprises a first passage detector 4A and a second passage detector 4B provided in the vicinity of the note inlet. The detection signals of these detectors are applied to the conveyance confirming circuit 13, which produces the note insertion confirmation signal SO when the note 6 is inserted into the note inlet, a feed confirmation signal OK when the note has passed through the first and second passage detectors 4A and 4B in the described order, and a return confirmation signal GA when the note has passed through the second and first passage detectors 4B and 4A in the reverse order.

Figure 3:
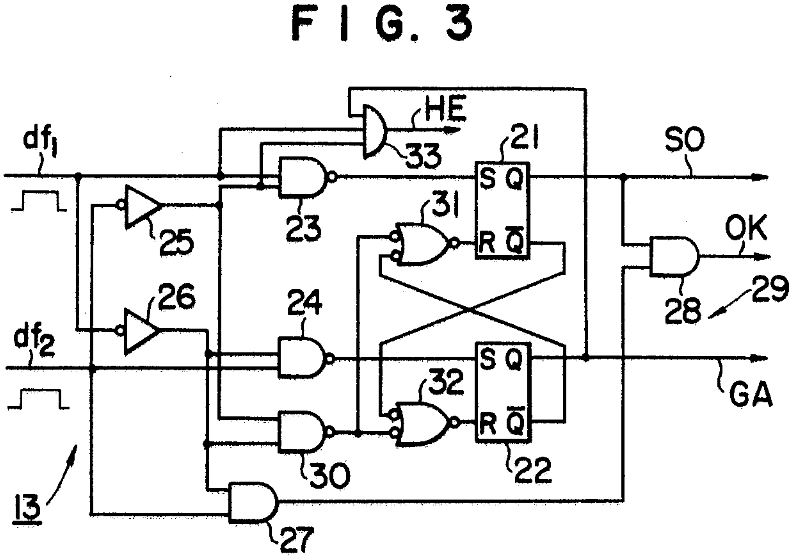
FIG. 3 is a schematic diagram illustrating the conveyance confirming circuit.

The conveyance confirming circuit 13, as shown in FIG. 3, comprises a feed direction circuit 21 and a return direction circuit 22 (each constituted, for instance, by an R-S flip-flop circuit) which respectively receive set inputs from set input circuits 23 and 24 each comprising a two-input NAND circuit.

The set input circuit 23 receives as one of its inputs the output $df_1$ of the first detector 4A through an inversion amplifier (not shown), and also as the other input the output $df_2$ of the second detector 4B through an inversion amplifier (not shown) and through the inverter 25. The set input circuit 23 thus connected sets the feed direction circuit 21 when the detector 4A produces the output $df_1$ at the time instant $t_1$(FIG. 2) after the insertion of the note 6. The Q output of feed direction circuit 21 is delivered as the insertion confirmation signal SO (C in FIG. 2).

On the other hand, the set input circuit 24 receives as one of its inputs the inverted output $df_1$ of the first detector 4A through an inverter 26, and also receives as the other input the inverted output $df_2$ of the second detector 4B. The set input circuit 24 thus connected sets the return direction circuit 22 when the second detector 4B produces the output $df_2$ at the time instant $t_5$ (FIG. 2) after the note has been conveyed in the return direction by the note conveying means 3. The Q output of return direction circuit 22 is delivered as the return confirmation signal GA (D in FIG. 2).

The conveyance confirming circuit 13 further comprises a feed confirming circuit 29 which is constituted by the two-input AND circuits 27 and 28. The two-input AND circuit 27 receives as one of its two inputs the inverted output $df_1$ of the first detector 4A through the inverter 26 and further receives the inverted output $df_2$ of the second detector 4B as the other input. On the other hand, the two-input AND circuit 28 receives the output of the AND circuit 27 and the Q output of the feed direction circuit 21. The feed confirming circuit 29 produces the feed confirmation signal OK (E in FIG. 2). This is produced by the AND circuit 28 when the note 6 has passed through the detector 4A and has not passed through detector 4B after the setting of the feed direction circuit 21.

The conveyance confirming circuit 13 further comprises a reset input circuit 30 constituted by a two-input NAND circuit which receives the inverted outputs $df_1$ and $df_2$ of the detectors 4A and 4B through inverters 26 and 25 respectively, and which when no note is present at any of the positions of the detectors 4A and 4B (before $t_1$, between $t_4$ and $t_5$, or after $t_8$ in FIG. 2), applies a reset signal of a logic "L" level to the reset terminals of the circuits 21 and 22 respectively through OR gates 31 and 32. The $\overline{Q}$ outputs of the circuits 21 and 22 are mutually applied to the reset terminals of the circuits 22 and 21 through the OR circuits 32 and 31 so as to be mutually interlocked.

The circuit 13 further comprises a clear circuit 33 return direction circuit 22 cconstituting the return conformation signal GA, and produces a return clear signal HE (F of FIG. 2) when the note conveyed in clear circuit 33 comprising a three-input AND circuit. This circuit 33 receives the input signals applied to the set input circuit 23 and also the set output of the return direction circuit 22, and when a note conveyed in the return direction along the note conveying path 3 arrives at the position of the detector 4 and confronts the first detector 4A only (or when the note has passed through the second detector 4B at the time instant $t_7$).

The predetermined-position confirming detector 7 causes the position detecting circuit 35 to produce a predetermined position signal TE by sensing the tip end, of the note when the note conveyed in the feed direction arrives at the position of the note examining means 5.

The outputs of the conveyance confirming circuit 13, the discrimination circuit 10, and the position detecting circuit 35 are applied to a conveyance control circuit 40 described below.

Figure 4:
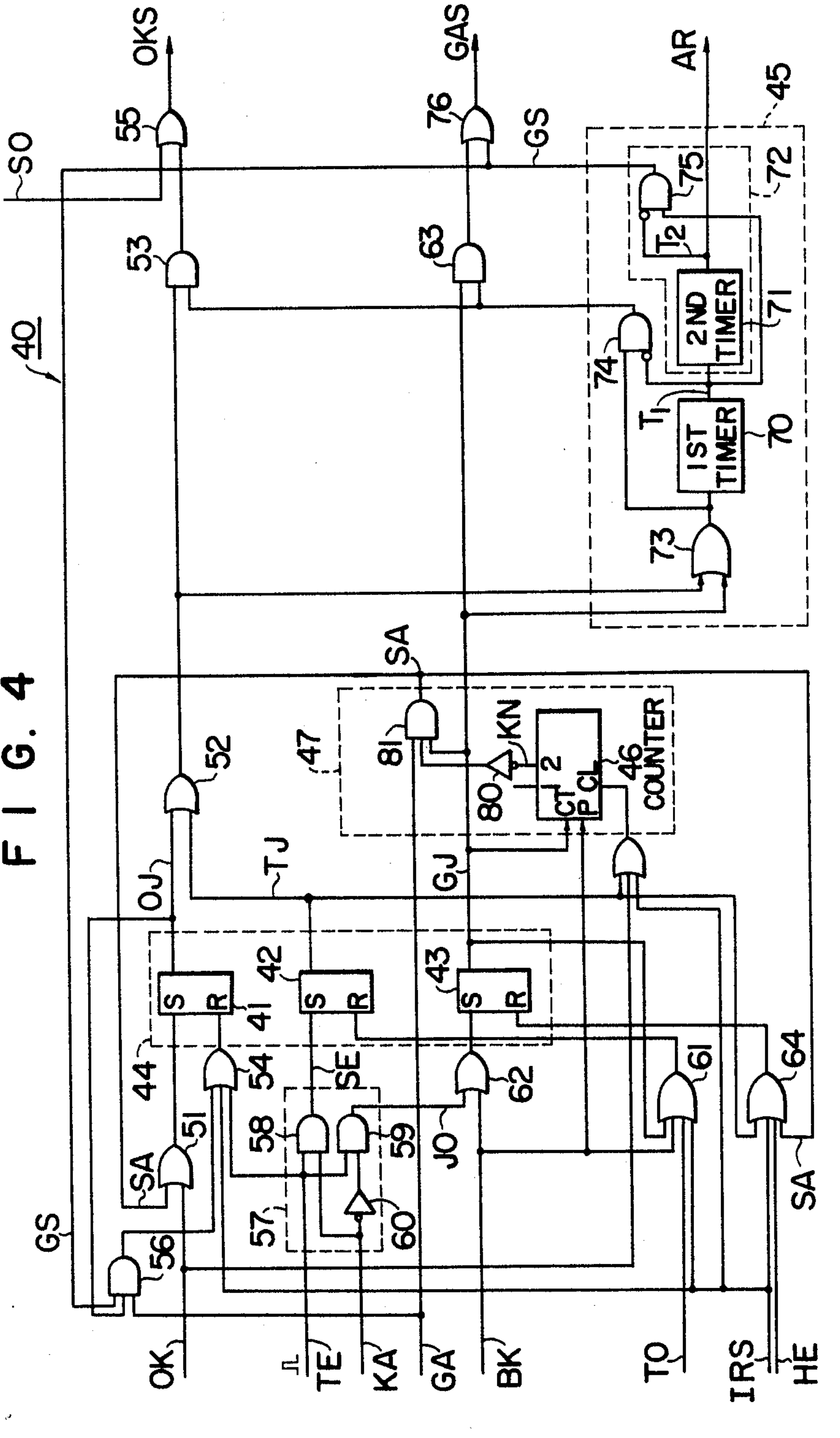
FIG. 4 is also a schematic diagram illustrating the conveyance control circuit of the note discriminating apparatus shown in FIG. 1.

The conveyance control circuit 40, as shown in FIG. 4, comprises: the condition signal generating circuit 44 constituted by the feed condition circuit 41, a taking-in condition circuit 42, and the return condition circuit 43 each comprising, for instance, an R-S flip-flop circuit; the output control circuit 45 operating to control the outputs of the feed signal OKS, and the return signal GAS by based on the outputs of these condition circuits 41, 42 and 43; and the re-discrimination start circuit 47 provided with the return counter 46 which counts the number of returning operations when the note examining means 5 has determined the note unacceptable and returns the note.

The time when a note is determined to be acceptable or normal will be hereinafter referred to as "a normal discrimination time", and similarly the time when a note is determined to be unacceptable or abnormal will be hereinafter referred to as "an abnormal discrimination time", when applicable.

The feed condition circuit 41 is set by receiving through an OR circuit 51 the feed confirmation signal OK or a re-discrimination start signal SA, and applies its output as the feed condition signal OJ to an output gate circuit 53 (a two-input AND circuit) through an OR circuit 52. On the other hand, the reset terminal of the feed conditions circuit 41 receives the predetermined position signal TE through an OR circuit 54.

The feed condition circuit 41 produces the feed condition signal OJ during the period from when the feed confirmation signal OK has been obtained by inserting the note into the note inlet until the note reaches the position of the note examining means 5 to obtain the predetermined-position signal TE, or produces the feed condition signal OJ during the period from when the note has been conveyed in the return direction to the detector 4 and the re-discrimination start signal SA has been produced by the re-discrimination start circuit 47 (described later) until the position signal TE is obtained. The signal OJ is delivered as the signal OKS through the output AND gate 53 when it is open, and through an output OR gate 55.

The conveyance control circuit 40 further comprises a back-up circuit 56 for the operation of the feed condition circuit 41. The back-up circuit 56 operates to AND the return start signal GS produced by the output control circuit 45, the return confirmation signal GA, and the feed condition signal OJ, and to apply this AND output as a reset input to the feed condition circuit 41 through the OR circuit 54, thereby to positively maintain the feed condition signal OJ in the reset state after the return of the note has been confirmed.

The take-in condition circuit 42 is set by receiving the discrimination signal KA and the predetermined-position signal TE through the discrimination signal input circuit 57, and applies its output, as a take-in condition signal TJ, to the output gate circuit 53 through the OR circuit 52.

The discrimination signal input circuit 57 comprises the AND circuit 58 for a normal signal, and the AND circuit 59 for an abnormal signal. The AND circuit 58 receives the position signal TE in the form of a pulse, and also the discrimination signal KA whose level becomes a logic level "H" at the normal discrimination time, and the AND circuit 58 produces a normality judgement signal SE, as a set signal, during the pulse width of the predetermined position signal TE. On the other hand, the AND circuit 59 receives the position signal TE and also the discrimination signal KA whose level becomes a logic level "L" at the abnormal discrimination time through an inverter 60, and produces an abnormality judgement signal JO during the pulse width of the position signal TE.

To the reset terminal of the take-in condition circuit 42 the note arrival confirmation signal TO is applied through the OR circuit 61. As a result, the take-in condition circuit 42 produces a take-in condition signal TJ during the period from when the note 6 delivered to the position of the note examining means 5 has been recognized as normal by the discriminating circuit 10 until the note arrival confirmation signal TO is obtained. This take-in condition signal TJ is delivered, as the feed signal OKS, through the output gate circuit 53 when it is open. In addition, a manual return command signal BK which is employed for forcibly returning a note inserted during a note examining operation, and the return condition signal GJ of the return condition circuit 43 are applied through the OR circuit 61 to the reset terminal of the take-in condition circuit 42.

The return condition circuit 43 is set by receiving either the abnormality judgement signal JO of the discrimination signal input circuit 57 or the manual return command signal BK, and applied its output, as the return condition signal GJ, to the output gate circuit 63 constituted by a two-input AND circuit. To the reset terminal of the return condition circuit 43, the re-discrimination start signal SA and the return clear signal HE are applied through the reset input OR circuit 64. Thus, the return condition circuit 43 produces the return condition signal GJ unit in the case, where a note delivered to the position of the note examining means 5 has been determined to be abnormal by the discrimination circuit 10 the manual return command signal BK is received, or the return clear signal HE is applied thereto; or the return condition circuit 43 produces the return condition signal GJ until, in the case where conveying a note in the return direction has been started by the return start signal GS of the output control circuit 45 (described later), the re-discrimination start signal SA is obtained. This return condition signal GJ is delivered as the return signal GAS, through the output gate circuit 63 when it open and through an output OR gate 76. In addition, the take-in condition signal TJ of the take-in condition circuit 42 is applied through the reset input OR circuit 64 to the reset terminal of the return condition circuit 43.

Furthermore, to the reset terminals of the feed condition circuit 41, the take-in condition circuit 42, and the return condition circuit 43, the initial reset signal IRS is applied respectively through the reset input OR circuits 54, 61 and 64 during the initial start operation of the note discrimination apparatus.

The output control circuit 45 comprises the first timer 70 for time-counting the maximum reference time allowable for the period from the instant when the note 6 is conveyed in the feed or return direction from the first position in the note conveying path 3 until the instant when the note is conveyed to the second position in the note conveying path 3; and the abnormality control circuit 72 which when the period of time spent for actually conveying the note 6 is longer than the reference time, judges it as the occurrence of the trouble in the note conveying path 3, and produces the return start output GS for returning the note for a period of time set by the second timer 71.

In this example, each of the timers 70 and 71 is constituted, for instance, by a C-R integration circuit so that the time-counting operation of each timer is automatically reset when no input signal is applied thereto. The time limit of the first timer 70 is selected to be slightly longer (for instance, about ten seconds) than the conveying time in the normal conveyance, while the time limit of the second timer 71 is selected to be slightly longer (for instance, about 2.5 seconds) than the time which is necessary for returning a note to the note inlet in the return conveyance. In the case where it is considered impossible to eliminate the trouble in the note conveying path by returning the note, it is better to stop conveying the note so as not to tear it.

The feed condition signal OH, the taken-in condition signal TJ, and the return condition signal GJ are applied to the first timer 70 through the input OR circuit 73, thereby to start the time-counting operation of the first timer 70. In addition, these signals 0J, TJ and GJ thus applied to the timer 70 are also applied to an output gate signal forming circuit 74 (constituted by an inhibit gate circuit) adapted to receive as an inhibit input the time lapse output $T_1$ of the timer 70, thereby to cause the circuit 74 to produce an open control signal for the output gate circuits 53 and 63.

The time lapse output $T_1$ obtained when the time limit of the timer 70 has passed is applied to the second timer 71 in the abnormality judgement circuit 72 to start the time-counting operation of the second timer 71, and is also applied to the return start circuit 75 constituted by an inhibit gate circuit which receives as an inhibit input the time lapse output $T_2$ of the second timer 71, as a result of which the return start signal GS is produced by the circuit 75 during the time counting operation of the second timer 75. This is delivered as the return signal GAS through the OR circuit 76.

On the other hand, the time lapse signal $T_2$ of the second timer 71 is delivered out as an alarm signal AR indicating the occurrence of note trouble, thereby to stop, for instance, the entire operation of the note discriminating apparatus.

The note insertion confirmation signal SO is applied to the OR circuit 55, and is delivered out as the feed signal OKS.

The return counter 46 in the re-discrimination circuit 47 receives the return condition signal GJ as its count input and whenever the return condition signal GJ is produced, counts it. When the count of the return counter 46 reaches a predetermined number (two in this example), the counter 46 produces the count signal KN at a logic level "H". This count signal KN is inverted by the inverter 80, and is then applied, as a third condition signal, to the re-discrimination signal forming circuit 81 constituted by a three-input AND circuit which receives the return confirmation signal GA and the return condition signal GJ as first and second condition signals, respectively. Thus, before the return condition signal GJ is produced twice, the circuit 81 produces the re-discrimination start signal SA when the return confirmation signal GA is applied thereto. This signal, as was described before, is applied, as a set signal, to the feed condition circuit 41, and is applied, as a reset signal, to the return condition circuit 43. However, when the content of the counter 46 becomes two (in this example), the generation of the re-discrimination start signal by the re-discrimination start circuit 47 is inhibited.

In this case when a note inserted and conveyed is forcibly returned, the manual return command signal BK is applied, as a preset input, to the return counter 46. In this case, the counter 46 is set to a predetermined return count number (two in this example), and the production of the re-discrimination start signal SA by the circuit 81 is inhibited.

Figure 5:
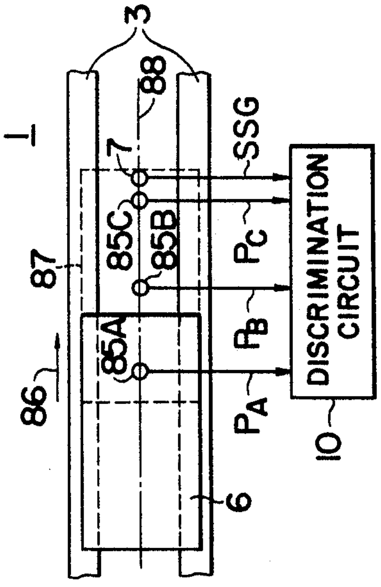
Figure 6:
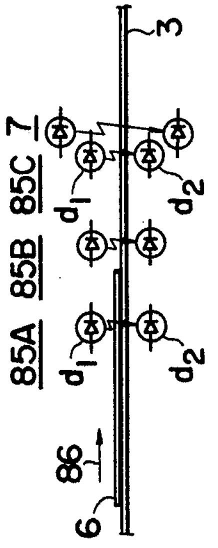

In this example, the note examining apparatus body 1 performs the note recognition operation by utilizing the optical characteristics of the note as discrimination factors, and as shown in FIG. 5, comprises three optical detectors 85A, 85B and 85C. Each of the optical detectors 85A-85C, as shown in FIG. 6, comprises a light emitting diode $d_1$ disposed on one side of (or above) the note conveying path 3 and a photoelectric transducer $d_2$ disposed on the other side (or below), and the output of the transducer $d_2$ is introduced into the discrimination circuit 10.

It is assumed that the note 6 inserted into the note inlet is continuously conveyed in the direction of the arrow 86 alon the note conveying path 3, and is passed through the note discriminating position 87.

The first, second and third detectors 85A, 85B and 85C are disposed, for instance, on the center line 88 of the path 3 opposite the rear end point, the central point and the front end point of the note, respectively when the note has arrived at the note discriminating position 87. As the note passes through the position 87, the detectors 85A, 85B and 85C produce detection signals $P_A$, $P_B$ and $P_C$ (A, B and C in FIG. 7) corresponding to the light transmissibility of the three points of the note, respectively.

Figure 8:
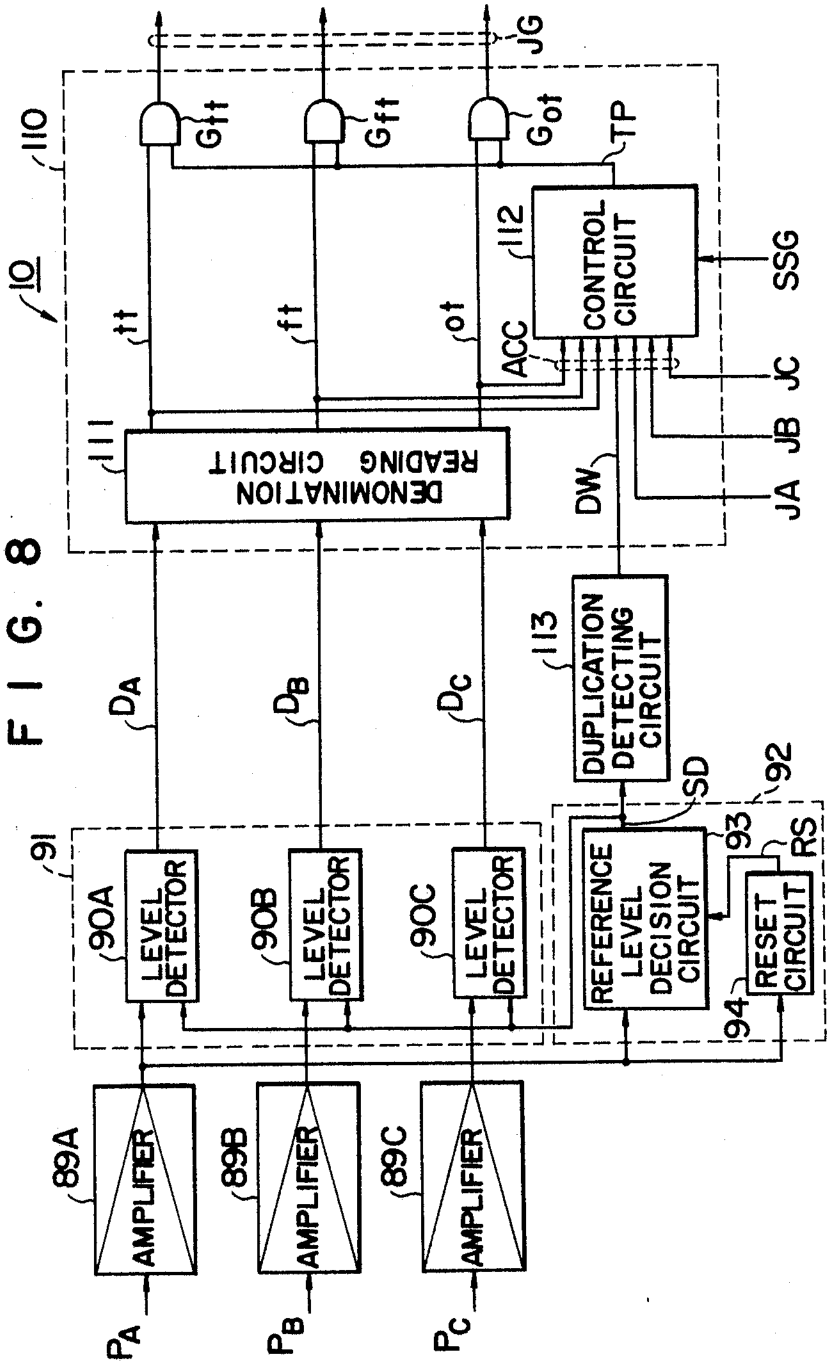

The discrimination circuit 10, as shown in FIG. 8, comprises a level detecting section 91 constituted by level detectors 90A, 90B 90B and 90C (each being, for instance, a differential amplifier). These detectors 90A – 90C receive the detection signals $P_A$, $P_B$ and $P_C$ through polarity conversion amplifiers 89A 89B and 89C, respectively, and also receive a reference level signal SD from the reference level signal generating section 92. When the levels of the detection signals $P_{A-PC}$ are greater than the reference level signal SD, the level detectors 90A –90C produce judgment outputs $D_{A-DC}$ at logic "H" levels, respectively. In contrast to this, when the levels of the detection signals $P_{A-PC}$ are smaller than the reference level signal SD, the judgment outputs produced by the level detectors 90A – 90C are at logic "L" levels.

The reference level signal generating section 92, as shown in FIG. 8, comprises the reference level decision circuit 93 constituted by an integration circuit, and the reset circuit 94 provided for the decision circuit 93. The reference level decision circuit 93, as shown in FIG. 9, comprises the operational amplifier 96 receiving the detection signal $P_A$ through the input amplifier 95, the capacitor 97 connected between the input and the output of the operational amplifier 96, and the output amplifier 99, through which the integration output of the integration circuit 98 is delivered as the reference level signal SD.

Figure 7:
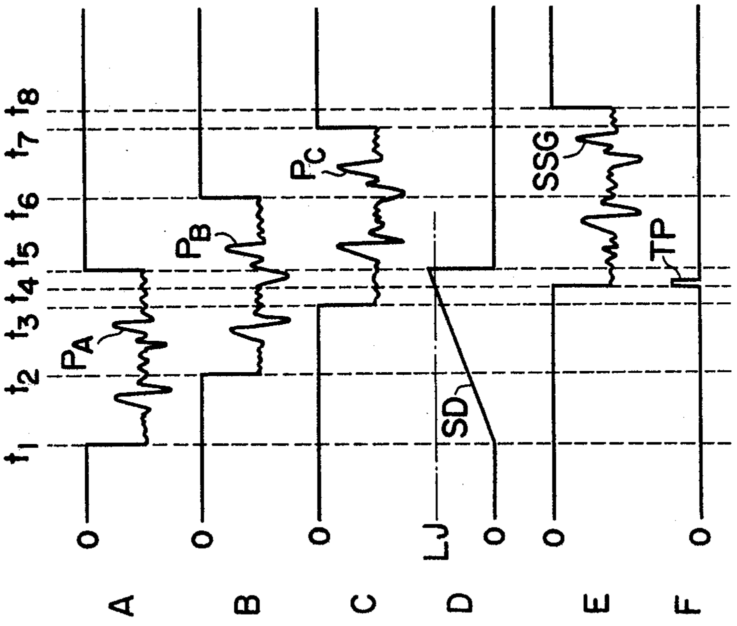
FIGS. 5 – 9 are schematic diagrams and waveform graphs illustrating a note examining apparatus body of the note discriminating apparatus shown in FIG. 1.

As indicated in D of FIG. 7, the reference level signal SD is at a "0" level before the time instance $t_1$ when the note 6 reaches the first detector 85A and also for the period of time during which the detection output $P_A$ is at the "0" level. However, for a period of time after the time instant $t_1$ till the note 6 has passed through the first detector 85A, the detection output $P_A$ has an alternating current waveform corresponding to light transmissibility of the note 6 (A of FIG. 7), and the variation of the reference level signal SD is of a gradient of the light transmissibility of the note.

The reset circuit 94 receives the detection output $P_A$ of the first detector 85A, applies its reset signal RS to the decision circuit 93 in order to reset the output condition of the reference level signal SD when the level of the detection output $P_A$ becomes a "0" level, that is, after the time instant $t_5$ when the note 6 has passed through the first detector 85A.

Figure 9:
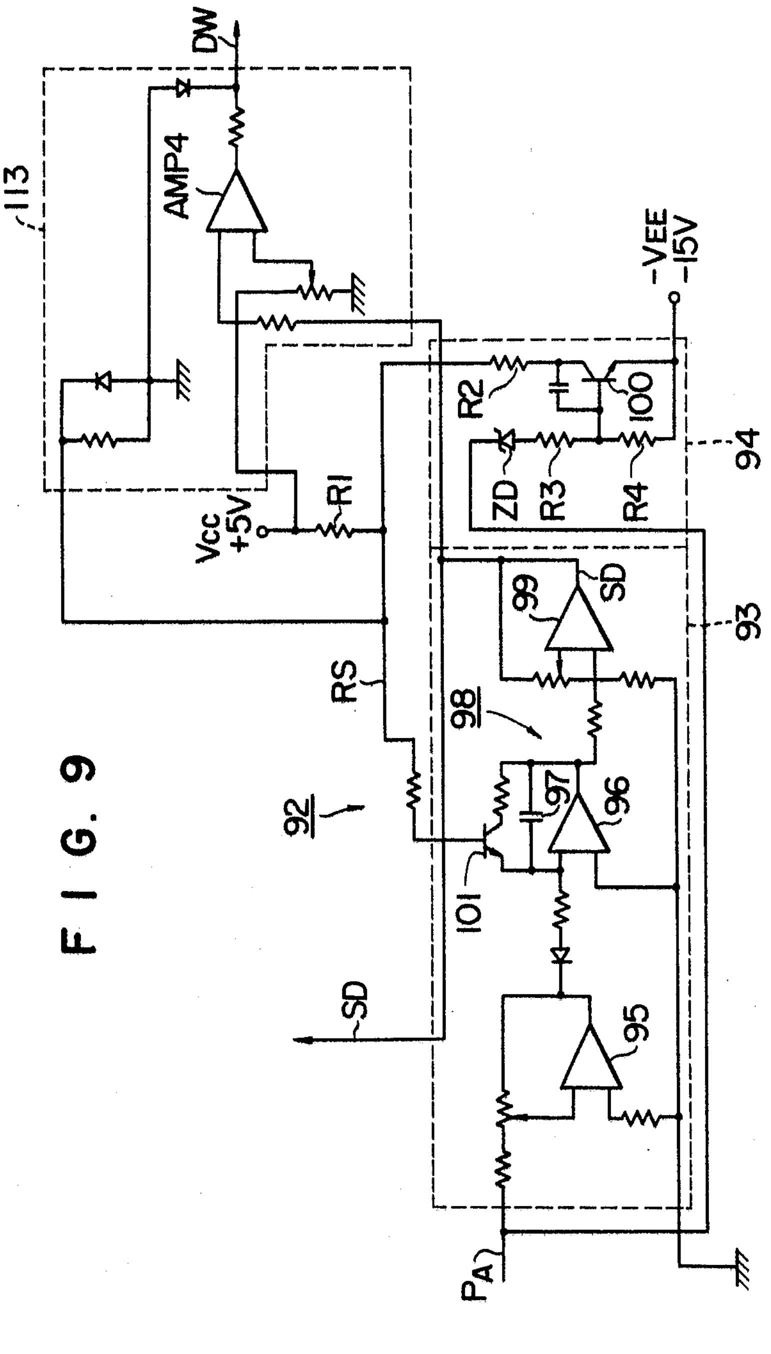

The reset circuit 94, as shown in FIG. 9, comprises the switching transistor 100 whose collector is connected to voltage dividing resistors $R_1$ and $R_2$. The detection output $P_A$ is applied to the base of the transistor 100 through a Zener diode ZD and bias resistors $R_3$ and $R_4$. When the normal output $P_A$ is at the detection level (that is, when the note 6 is not at the detector 85A, no current flows in the base circuit, and therefore the transistor 100 is rendered non-conductive. As a result, the connection point between the resistors $R_1$ and $R_2$ has an "H" level, which is applied, as the reset signal RS, to the decision circuit 93.

When the reset signal RS (of an "H" level) is applied to the base of the switching transistor 101 connected in parallel to the capacitor 97 of the decision circuit 93, the integration voltage of the capacitor 97 is reset through the transistor 101.

Thus, whenever the note begins to pass through the first detector 85A, the integration operation of the reference level decision circuit 93 is started, and thereafter when the note has passed through it, the reference level signal SD is reset. Therefore, with respect to the reference level signal increasing gradually, the level detectors 9A -90C produce the judgment outputs $D_A$– $D_C$ of "H" levels for period of time during which the levels of the corresponding detection outputs $P_A$ – $P_C$ are high, and furthermore the detectors produce the decision outputs $D_A$ – $D_C$ of "L" levels for a period of period during which the detection levels are low.

The decision outputs of the level detectors 90A – 90C are applied to a denomination discriminating section 110. This section 110 comprises: the denomination reading circuit 111 for, receiving as parallel code signals, the outputs of the level detectors 90A -90C thereby to determine the denomination from the contents of the signals; output gate circuits (or AND gates) $G_{tt}$, $G_{ft}$ and $G_{ot}$ receiving denomination signals tt, ft and ot representative of monetary denominations (10,000-yen, 5,000-yen and 1,000-yen in this example) read by the denomination reading circuit 111, and the discriminating operation control circuit 112 for generating the discrimination timing signal TP to determine the timing of discriminating operation.

When, as was described with reference to FIG. 5, the note 6 arrives at the note discrimination position 87, it is detected by the predetermined-position confirming detector 7 provided at the position corresponding to the front end of the note, and the detection signal SSG (E in FIG. 7) is produced by the detector 7. When this detection signal SSG is applied to the control circuit 112, the latter will produce the discrimination timing pulse signal TP (F in FIG. 7) provided that discrimination allowing signals ACC are applied thereto.

The outputs tt - ot of the denomination reading circuit 111 are employed as the first group of the discrimination allowing signals ACC. When any one of the outputs is at an "H" level, it is confirmed that a note is actually inserted and conveyed in the note conveying path 3. Furthermore, the duplication detection signal DW from the duplication detecting circuit 113 is employed as a second discrimination allowing signal ACC and is applied to the circuit 112. This duplication detecting circuit 113, as shown in FIG. 9, has the differential amplifier $AMP_4$ which receives through its differential input terminal the output SD of the reference level decision circuit 93. By utilizing the fact that when for instance two notes are inserted into the note conveying path 3, the rate of increase, with respect to time, of the output SD from the reference level decision circuit 93 is greater than that in the case of one note, the duplication detecting circuit 113 produces the duplication detection signal DW at an "H" level when the level of the differential input terminal becomes higher than that of the reference input terminal.

Thus, the control circuit 112 is so designed that it can produce the discrimination timing pulse signal TP when the duplication detection signal DW is at an "L" level (that is, the number of notes inserted is one).

Furthermore, employed as the third group of the discrimination allowing signals ACC are discrimination signals JA, JB and JC produced respectivly by a magnetic characteristic discriminator, a dimensional characteristic discriminator, and a color characteristic discriminator (these discriminators are not shown), and these signals JA – JC are applied to the circuit 112, whereby the discrimination timing pulse signal TP is produced on condition that the conditions for the other discriminating factors of the note are satisfied. This pulse signal TP is applied, as an open control signal, to the output gate circuits $G_{tt}$ – $G_{ot}$, and the denomination signals *tt* -*ot* delivered from the denomination reading circuit 111 are transferred as discrimination result outputs JG from the denomination discriminating section 110.

In the note examining apparatus body 1 thus constructed, before the time instant $t_1$ (FIG. 7) the outputs of the detectors 85A – 85C are all at the "0" level, and therefore the level of the output SD of the decision circuit 93 is also at the "0" level. Accordingly, the outputs of the level detectors 90A – 90C are all at the "L" level.

When the note 6 passes through the first detector 85A, and the detection output $P_A$ decreases to the detection level, this output is integrated by the reference level decision circuit 93, and the output of the decision circuit is gradually increased.

This condition is continued even if the note 6 successively passes through the second detector 85B and the third detector 85C respectively at the time instant $t_2$ and the time instant $t_3$. Therefore, the level detectors 90A –

90C compare the gradually increasing reference level signal SD with the detection signals $P_A$–$P_C$ of the polarity inverting amplifiers 89A – 89C, and produce the judgment outputs $D_A$–$D_C$ which become "L" levels, when the respective detection signals are smaller. However, in this period of time, the discrimination timing pulse signal TP is not produced by the discriminating operation control circuit 112 yet, and therefore the discrimination result output JG from the denomination discriminating section 110 is not produced.

When the note 6 reaches the position of the predetermined-position confirming detector 7, the latter 7 produces the detection signal SSG as shown in E of FIG. 7. Therefore, the control circuit 112 delivers the discrimination timing pulse signal TP (F in FIG. 7) at the time instant $t_4$, and the denomination signals *tt, ft, ot* read by the denomination reading circuit 111 are delivered as the discrimination result output JG through the output gate circuits $G_{tt}$, $G_{ft}$ or $G_{ot}$.

In this case, the note is located at the note discriminating position 87 in FIG. 5, and therefore the first, second and third 85A, 85A, 85B and 85C are opposite their respective discrimination points on the note. Thus, the outputs of these detectors 85A–85C become the levels corresponding to the light transmissibility of the above-described points (that is, levels obtained by combining the thickness, stain and damage of the note), respectively. On the other hand, the output SD of the reference level decision circuit 93 reaches a level LJ at the time instant $t_4$, which corresponds to the combination of the stain, damage and thickness of the note.

Accordingly, the effect of fluctuation in the light transmissiblility of the note due to the stain, damage and thickness thereof is reduced in the judgment outputs $D_A$–$D_C$ of the level detectors 90A–90C.

The fact that the discrimination result output JG is produced as described above, means that the discrimination result of the discriminating circuit 10 is normal. In contrast to this, if the output JG is not produced, it means that the discrimination result is abnormal. This abnormal discrimination result is caused by the fact that the note was inserted irregularly with respect to the discrimination position, or it is a false note.

The operation of the note discriminating apparatus will be described.

First of all, the operation of the apparatus in the case where the conveying operation in the note conveying path 3 is normal, and notes are not caught or slipped in the note conveying path will be described. (Hereinafter such trouble will be referred to as "note troube" when applicable.)

When a note is inserted into the note inlet, the feed direction circuit 21 (FIG. 3) is set at the time instant $t_1$(FIG. 2), and the note insertion confirmation signal SO is obtained. This signal SO is delivered, as the feed signal OKS, through the output OR circuit 55 (FIG. 4), as a result of which the driving motor in the note conveying path is rotated so that the note 6 is conveyed in the feed direction.

When the note 6 passes through the first detector 4A and the feed confirmation signal OK (E in FIG. 2) is produced at the time $t_3$, the feed condition circuit 41 is set (FIG. 4), whereby its feed condition signal OJ causes the first timer 70 to start its timecounting operation, and is delivered as the feed signal OKS through the output gate circuit 53 which is opened at this time. Thus, the note 6 is continuously conveyed in the feed direction.

When the note 6 reaches the position of the note examining means 5, the predetermined-position signal TE is produced to reset the feed condition circuit 41, and accordingly the first timer 70. If as in this case the discrimination result is normal, the take-in condition circuit 42 is set, and the take-in condition signal TJ thereof causes the first timer to start its time-counting operation again and is simultaneously delivered, as the feed signal OKS, through the output gate circuit 53. Thus, the note 6 is further conveyed in the feed direction and is finally put into the stacker 11. During this operation, the note arrival confirmation signal TO is obtained, as a result of which the take-in condition circuit 42 is reset and the first timer 70 is then reset. Finally, the note conveying operation is suspended.

In the case where a note is not caught or slipped in the note conveying path 3, the actual note conveying time is shorter than the time limit of the first timer 70, and therefore the control circuit 45 does not deliver any of the return start output GS and the alarm signal AR.

On the other hand, in the case where the discrimination result is abnormal because the note was inserted irregularly with respect to the discrimination position or is a false note, the take-in condition circuit 42 is not set, but the return condition circuit 43 is set, whereby the return condition signal GJ is delivered, as the return signal GAS, through the output gate circuit 63 so that the note 6 is conveyed in the return direction from the position of the note examining means 5.

In this operation, the counter 46 of the re-discrimination start circuit 47(FIG.4) counts the return, and therefore the content of the counter 46 becomes "one "; however, since the count output KN is at the "L" level, the generation of the re-discrimination start signal SA is not yet inhibited. Upon arrival of the note 6 to the position of the feed confirming and re-discrimination starting detector 4, the re-descrimination start signal SA is generated to reset the return condition circuit 43 and to set the feed condition circuit 41. As a result, the note is conveyed in the feed direction again and is subjected to examination again by the note examining means 5.

If this discrimination result is normal, as into the above described case the note 6 is taken in the stacker 11. This means that in the first discrimination the discrimination result was abnormal because the note 6 was placed irregularly with respect to the note discriminating position 87 (FIG. 5), but in the second discrimination the note 6 was realigned to be regular.

In contrast to this, if the discrimination result is again abnormal, similarly as in the above-described case where the first discrimination result was abnormal, the return signal GAS is delivered from the conveyence control circuit 40 (FIG. 4).

In this case, the return condition signal GJ is applied to the counter 46 in the re-discrimination start circuit 47 to cause the counter 46 to carry out its counting operation, as a result of which the content of the counter 46 becomes "two", and the level of the count signal KN becomes the "H" level. Accordingly, the re-discrimination start circuit 47 inhibits the generation of the re-discrimination start signal SA. Therefore, even if the note is returned to the position of the detector 4 and the return confirmation signal GA is generated, no re-discrimination start signal SA is generated, and therefore the note continues in the return direction.

As soon as the note 6 passes through the second detector 4B, the return clear signal HE is produced (FIG. 3), whereby the return condition circuit 43 (FIG.4) is reset and the conveying operation in the note conveying path 3 is suspended, so that the note is held so that one edge confronts the first detector 4A (FIG.1) and the opposite edge is protrudes outside the note inlet.

The operation of returning the note to the note inlet is thus completed. When the note is pulled out, the feed direction circuit 21 and the return direction circuit 22 are both reset, and finally the note discriminating apparatus is restored to its initial conditions.

The operation of the note discriminating apparatus in the case where the note is caught or slipped will now be described.

When the note 6 placed in the note conveying path 3 is caught or slipped therein, that is, the note is no longer conveyed because of note trouble, as in the above-described case the feed condition circuit 41 is set by the feed confirmation signal OK, and the first timer 70 starts its time-counting operation. However, in this case the note 6 can not arrive at the note examining means 5, and therefore the timer 70 will produce the time lapse output $T_1$.

The gate output of the output gate signal forming circuit 74 is inhibited by the output $T_1$ described above, and accordingly the delivery of the feed signal OKS which has been delivered with the aid of the feed condition signal OJ is suspended. On the other hand, because of the production of the output $T_1$ the return start signal GS is produced by the abnormality control circuit 72, and it is delivered as the return signal GAS. As a result, the note conveying path 3 starts to return the note.

If the note trouble in the note conveying path 3, is eliminated by the note returning operation, the note is returned to the note inlet, and when the return confirmation signal GA is obtained the feed condition circuit 41 is reset, and the timers 70 and 71 are therefore reset. As a result, the delivery of the return signal GAS is suspended, and the note conveying operation is also suspended. Finally, the note discriminating apparatus is restored to its initial conditions.

If the above-described note trouble cannot be eliminated by the note returning operation of the note conveying path 3, the second timer 71 also will generate its time laspe output $T_2$. Accordingly, the delivery of the return start signal GS from the circuit 72 is inhibited, and the return signal GAS is not provided. As a result, the note returning operation of the note conveying path 3 is suspended, and simultaneously the alarm signal AR is produced with the aid of the output $T_2$ of the second timer 71. That is, the production of the alarm signal AR means that the note trouble must be manually eliminated.

Such trouble may also be caused after a note has been recognized as normal by the note examining means 5 and forwarded to the stacker 11. In this case, the take-in condition circuit 42 is set and the take-in condition signal TJ is produced, but the take-in condition circuit 42 will not be reset (the take-in confirmation signal TO is not applied thereto because the note 6 is caught or slipped before reaching note arrival confirming detector 12). Therefore, similarly as in the above-described case, the return signal GAS is provided with the aid of the output $T_1$ of the first timer 70. The operation of abnormally control circuit 72 is similar to its operation in the previous case.

Furthermore, such note trouble may also be caused where a note conveyed to the note examining means 5 has been recognized a abnormal and it is therefore conveyed toward the detector 4.

In this case, the return condition circuit 43 is set and the return condition signal GJ is provided, but the return condition circuit 43 is not reset (because the re-discrimination start signal SA is not produced). Accordingly, the return signal GAS is continuously produced with the aid of the output $T_1$ of the first timer 70, and thereafter the note conveying operation is suspended by the output $T_2$ of the second timer 71.

As is apparent from the above description, the note discriminating apparatus according to this invention is so designed that if, when the note 6 is conveyed to the note discrimination position by the note conveying means 3, is recognized as abnormal, the note is conveyed back in the return direction and is conveyed in the feed direction again so that it is examined again. Therefore, even if a note is placed somewhat irregular with respect to the discrimination position, the position of the note can be corrected by the apparatus, which leads to an improvement in the accuracy of the note discrimination result. Furthermore, even if a note is recognized as abnormal once, the note is not immediately returned to the operator and the re-discrimination of the note is carried out. Accordingly, the number of steps which must be taken by the operator with the note discriminating apparatus according to this invention is reduced, and accordingly it can be said that the note discriminating apparatus of the invention has a considerably high reliability.

As was described above, in this invention, when a note is caught or slipped in the note conveying path, the note conveying direction is automatically reversed to eliminate such note trouble. Thus, the note discriminating apparatus according to this invention is improved in reliability when compared with the case in which such note trouble must be eliminated manually. Furthermore, if with respect to the reversal of the note conveying direction, the apparatus is so designed that when a note cannot arrive to the predetermined position during a predetermined reference time after the conveyance of the note has been started, the non-arrival of the note is detected, and the occurence of note troubles can be more positively detected.

Furthermore, as was described with reference to FIG. 4, in the case when the note trouble cannot be automatically eliminated in a certain period of time (in the time limit of the second timer 71 in the case of FIG. 4) after the note conveying direction has been reversed, the note conveying operation is suspended and the alarm signal is produced. This leads to protection of the note from damage, and to labor saving.

Accordingly, the control and maintenance of the apparatus are considerably simplified.

As is apparent from the above description, according to this invention, the reference level signal is determined by taking into account the characteristics of the note conveyed to the predetermined note discriminating position, and the detection signals from the discrimination points are compared with this reference level. Therefore, the discrimination result is not affected by fluctuation in the characteristics of the note. If in this operation the environmental conditions of the detector for determining the reference level are made equal to those of the detectors for examining the discrimination points on the note, the effects of, for instance, ambient temperature and external light can be reduced.

In the example described above, the reference level is obtained from the detection output of the first detector 85A by the use of the reference level generating section 92 constituted by an integration circuit; however the reference level can be obtained directly from the detection signal $P_A$ of the first detector 85A (without integration) at the time when the discrimination timing pulse signal is produced by the discriminating operation control circuit 112.

Furthermore, the detectors 85A, 85B and 85C are optical detecting means, but they may be replaced by, for instance, magnetic detecting means.

In addition, in the embodiment shown in FIGS. 5–9, if in the predetermined range of a note to be discriminated the first detector 85A produces the detection signal $P_A$ in the form of alternating current, and the reference level signal SD is obtained by integrating this detection signal $P_A$, the following merits can be obtained in addition to the above described merits.

(1) The variation of the reference level caused by fluctuation in the characteristics of the components of the reference level generating section 92, or by ambient temperature, humidity, and external light, or by the effect of electromagnetic means (such as electric motors, or plungers) adjacent thereto, can be reduced.

(2) The detector 85A provided for generating the reference level can be used also as the detector for examining the discrimination point.

(3) Even if the note has local stains or pin holes, the effect of the stains or pin holes can be reduced.

(4) The reference level signal SD provided when no note is inserted into the note conveying path is considerably different from that SD provided when a note is inserted thereinto. By utilizing this fact, the erroneous operation can be positively prevented without the provision of an erroneous operation preventing gate circuit.

Furthermore, if the reference level generating section 92 is designed so that whenever a note passes through the note discrimination position 87, the reference level signal calculation operaton is reset, and also in the case where a plurality of note discriminating operations are carried out successively, such an operation can be readily achieved by a relatively simple arrangement.

Figure 10:
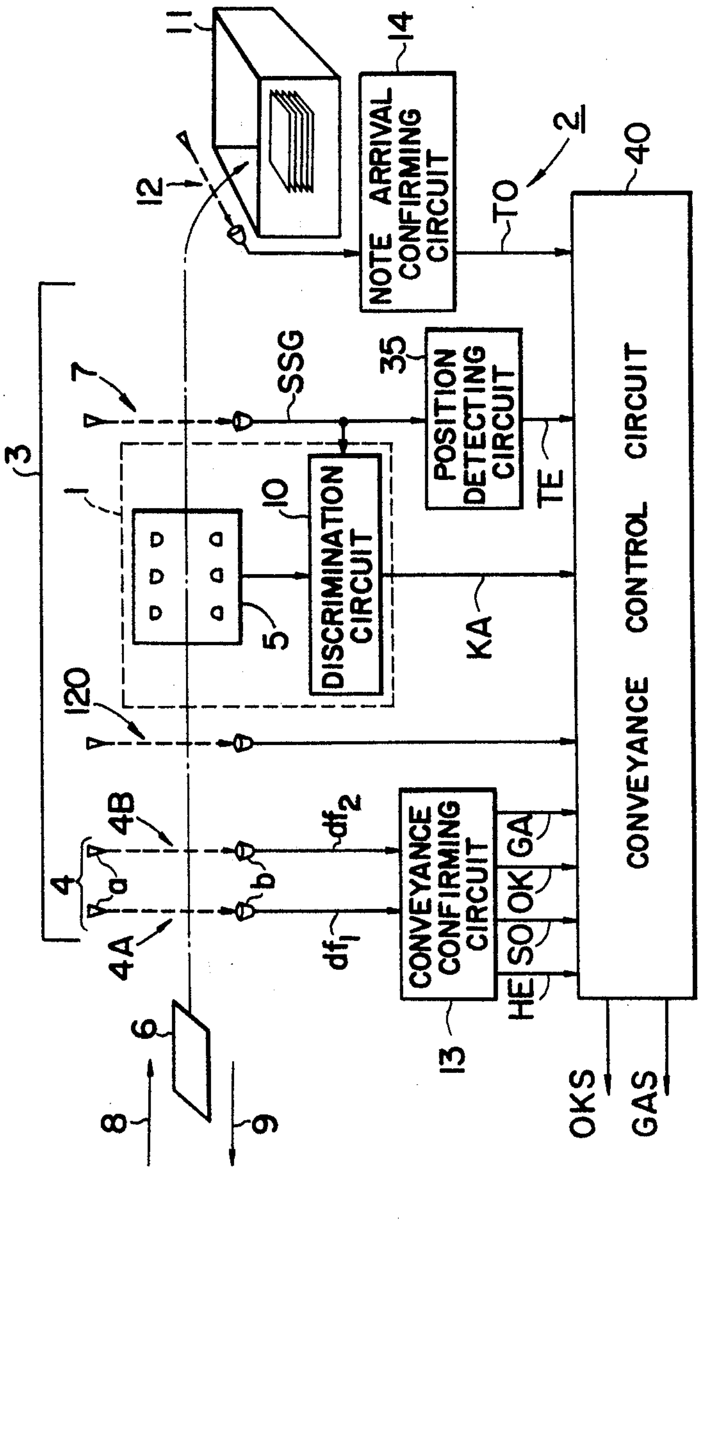
FIG. 10 is a block diagram showing another example of the note discriminating apparatus according to the invention.

In the above-described apparatus, in order that a note conveyed in the return direction because of the abnormal discrimination result is conveyed in the feed direction again, the re-discrimination start signal SA is produced based on the operation of the detector 4 provided in the vicinity of the note inlet. However, the apparatus may be modified so that a re-discrimination starting detector 120 for producing the re-discrimination start signal is disposed between the detectors 4 and 5 described before as shown in FIG. 10, and that when a note is conveyed in the return direction to the position of the detector 120, the re-discrimination start signal SA is obtained with the aid of the detection output of the detector 120. In this modification, the return confirmation signal GA applied to the re-discrimination start signal forming circuit 81 should be replaced by the output of the re-discrimination starting detector 120.

Another concrete example of the note examining apparatus body 1 included in the note discriminating apparatus according to this invention will be described with reference to FIGS. 11 through 15.

Figure 11:
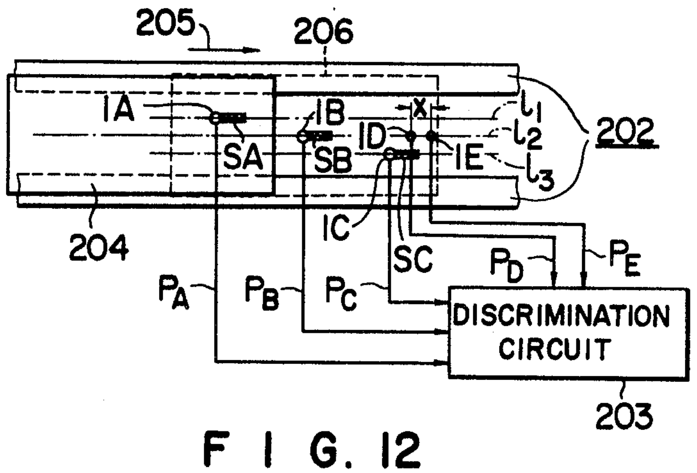
FIG. 11 is an explanatory diagram showing another example of the note examining apparatus body.
Figure 12:
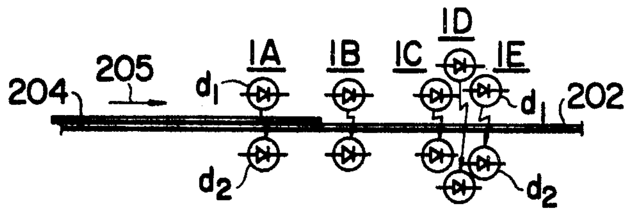
FIG. 12 is a schematic side view illustrating the note conveying path of the note discriminating apparatus.

This example, as shown in FIG. 11, comprises; three optical detectors 1A, 1B and 1C for examination of the note; and two optical detectors 1D and 1E employed for discrimination operation, which are similar in construction and function to the detectors 1A - 1C. Each of the detectors 1A – 1E comprises a light emitting diode $d_1$ and a photoelectric transducer $d_2$, which are arranged to oppose each other through a note conveying means 202 constituted by, for instance, an endless belt (which may be referred to as a note conveying path 202 when applicable) which is extended between these elements $d_1$ and $d_2$ (FIG. 12). The output of the element $d_2$ are applied to the note discrimination circuit 203.

Now, it is assumed that a note 204 inserted into the note inlet (not shown) is continuously conveyed in the direction of the arrow 205 to pass through a note discrimination position 206 shown by the dotted line in FIG. 11.

The detectors 1A, 1B and 1C are disposed, for instance, on three parallel phantom lines $l_1$, $l_2$ and $l_3$ in the note conveying path 202 so as to respectively examine the rear point, the central point and the front point of the note when the note has reached the discriminating position 206. As the note 204 passes through the discriminating position 206, the detectors 1A – 1C produce detection signals $P_A$, $P_B$ and $P_C$ (A, B, and C in FIG. 13) corresponding to the respective light transmissibility of the three points.

On the other hand, the detectors 1D and 1E are spaced a predetermined distance $x$ from each other on the phantom line $l_2$ so that when the note has reached the discriminating position 206, the detectors 1D and 1E confront the front end portion of the note and produce detection signals $P_D$ and $P_E$ (H and I of FIG. 13) respectively.

Figure 14:
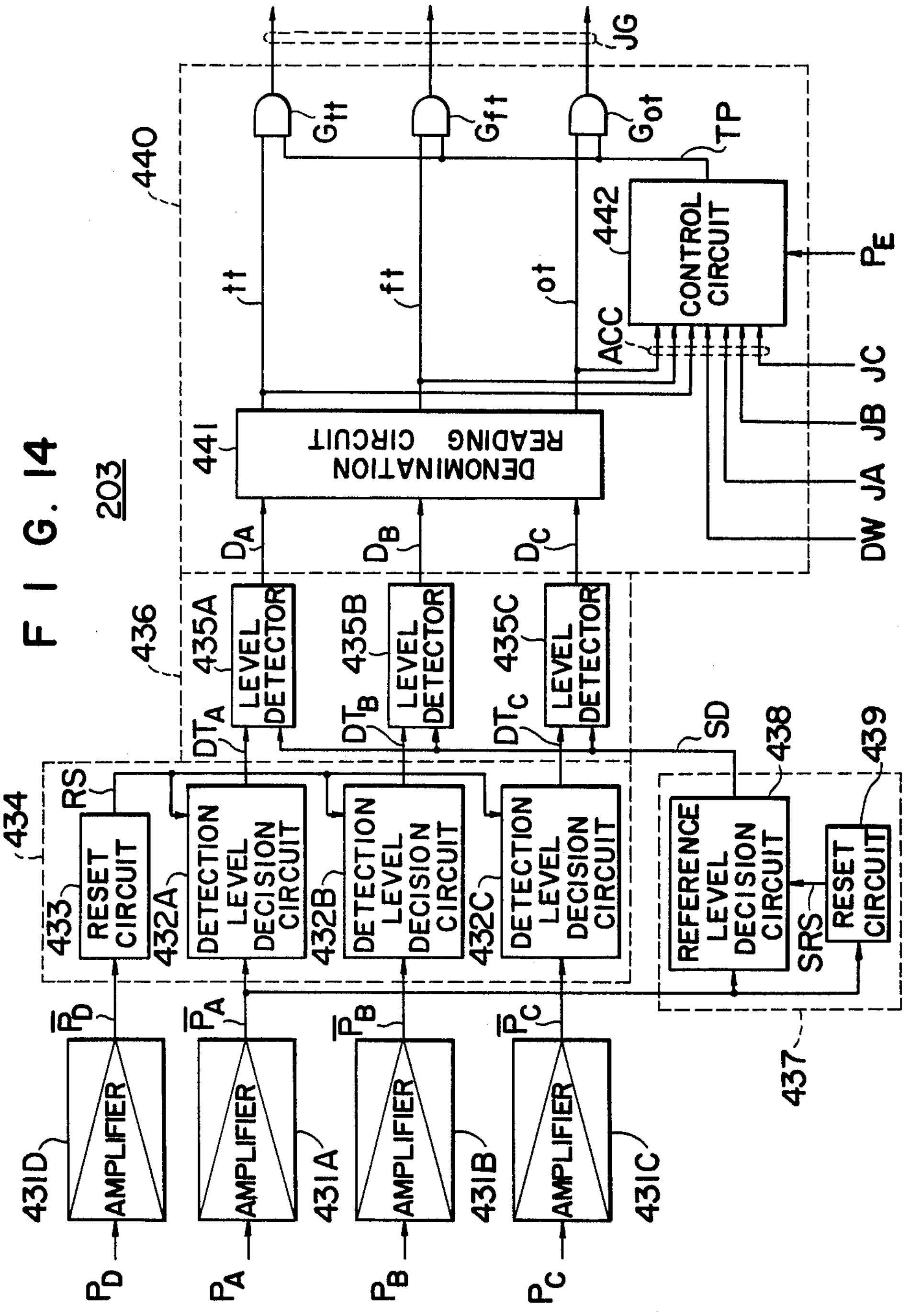
FIG. 14 is a block diagram illustrating a note discrimination circuit of the note discriminating apparatus body shown in FIG. 11.

The note discrimination circuit 203, as shown in FIG. 14, comprises a detection level generating section 434 having: detection level decision circuits 432A, 432B and 432C which receive the detection level outputs $P_A$, $P_B$ and $P_C$ through polarity inversion amplifiers 431A, 431B and 431C, respectively; and the reset circuit 433 for these decision circuits.

Figure 15:
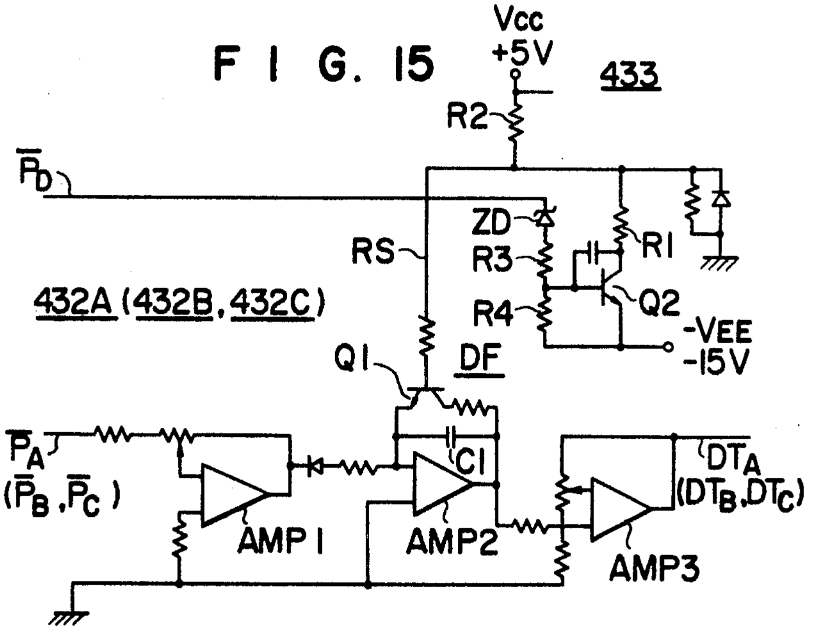
FIG. 15 is a schematic diagram showing the detection level generating section of the note discrimination circuit shown in FIG. 14.

The detection level decision circuit 432A (or 432B or 432C), as shown in FIG. 15, comprises an integration circuit DG constituted by the input amplifier $AMP_1$ for receiving the inverted detection output $\overline{P}_a$ (or $\overline{P}_B$ or $\overline{P}_C$) of the detector 1A (or 1B or 1C), the operational amplifier $AMP_2$ connected thereto, and the capacitor $C_1$ connected between the output and the input of the amplifier $AMP_2$. The decision circuit 432A (or 432B or 432C) delivers its integration output, as a detection point level signal $DT_A$ (or $DT_B$ or $DT_C$), through the output amplifier $AMP_3$.

The resetting switching transistor $Q_1$ is connected in parallel to the capacitor $C_1$. When this transistor $Q_1$ is rendered conductive by the reset signal RS from the reset circuit 433, the integration voltage of the capacitor $C_1$ is reset through the transistor $Q_1$.

The reset circuit 433 comprises the switching transistor $Q_2$, and voltage dividing resistors $R_1$ and $R_2$ connected to the collector of the transistor $Q_2$ (FIG. 15). When the detection signal $P_D$ from the detector 1D is applied, as an output $\overline{P}_D$, through the polarity inversion amplifier 431D to the reset circuit 433 (FIG. 14), this detection signal is applied to the base of the transistor $Q_2$ through a Zener diode ZD, and bias resistors $R_3$ and $R_4$. When the detection output $\overline{P}_D$ is at the "0" level (that is, when a note is not present at the position of the detector 1D), no current flows in the base circuit. Accordingly, the transistor $Q_2$ is rendered non-conductive. Therefore the level at the connection point between the resistors $R_1$ and $R_2$ becomes an "H" level, and this is applied, as the reset signal RS, to the base of the transistor $Q_1$ of the decision circuit 432A (or 432B or 432C) to render the transistor $Q_1$ conductive, and the integration voltage of the capacitor $C_1$ is reset.

Accordingly, before the time instant $t_4$ (FIG. 13) when the note reaches the detector 1D, the integration circuit DF in the detection level decision circuit 432A (or 432B or 432C) does not carry out its integration operation because the reset circuit 433 provides the reset signal RS, and the signal $DT_A$ or $DT_B$ or $DT_C$) is at the "0" level. However, during a period of time from $t_4$ to $t_9$ (when the note 204 has passed through the detector 1D), the integration circuit DF of the decision circuit 432A (or 432B or 432C) integrates the detection signal $\bar{P}_A$ (or $\bar{P}_B$ or $\bar{P}_C$), as a result of which the signal $DT_A$ (or $DT_B$ or $DT_C$) changes in gradient corresponding to the detection output $\bar{P}_A$ (or $\bar{P}_B$ or $\bar{P}_C$), that is, the light transmissibility of the note 204.

The note discrimination circuit 203 (FIG. 14) further comprises the level detecting section 436 including level detectors 435A, 435B and 435C (each constituted by a differential amplifier) which receive the signal $DT_A$, $DT_B$ and $DT_C$ from the detection level decision circuits 432A, 432B and 432C, respectively. The level detectors 435A - 435C receive a reference level signal SD from a reference level generating section 437, and when the levels of the detection signals $P_A$ - $P_C$ are greater than the level of the reference level signal SD, provide judgement outputs $D_A$ - $D_C$ of logic "H" levels. (In the opposite case, the judgement outputs $D_A$ - $D_C$ becomes logic "L" level.)

The reference level generating section 437 comprises: the reference level decision circuit 438 which is the same as the detection level decision circuit 432A (FIG. 15); and a reset circuit 439 which is the same as the reset circuit 433 except for the input signal.

Figure 13:
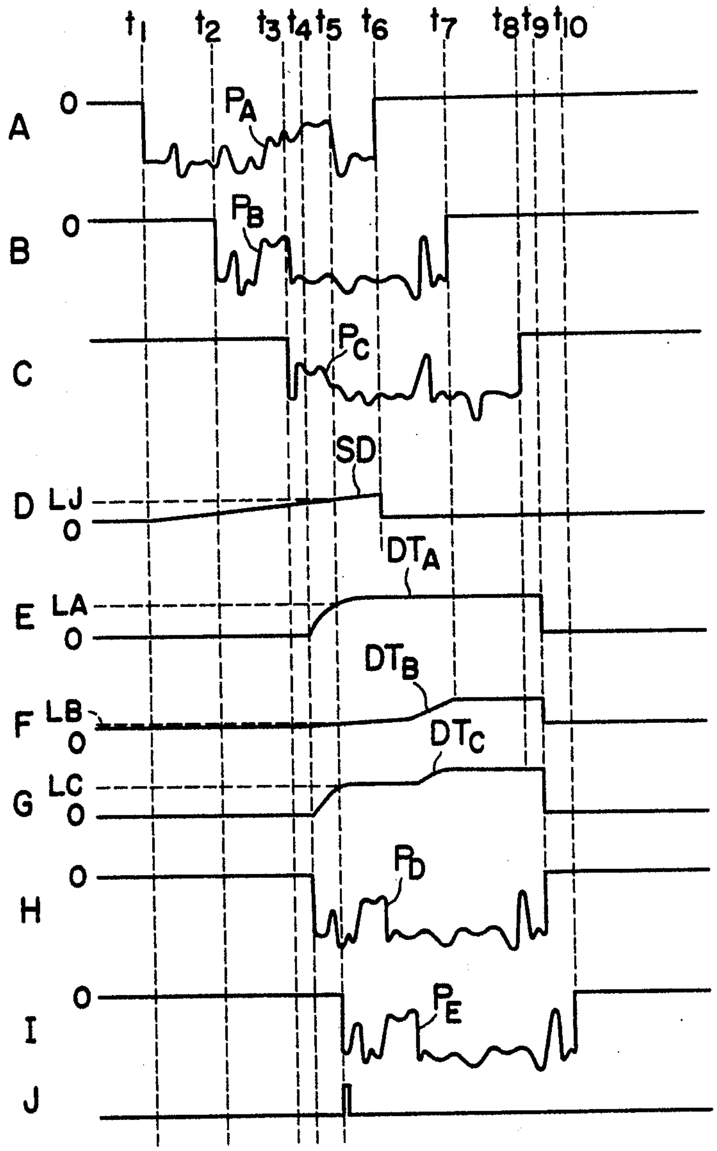
FIG. 13, consisting of A through F is a set of waveform charts indicating various signals employed in the note examining apparatus body shown in FIG. 11.

Thus, the reference level decision circuit 438, receives the detection signal $P_A$, and is reset by a reset signal SRS from the reset circuit 439 (also receiving the detection signal $P_A$) before the time instant $t_1$ when a note arrives at the position of the detector 1A, and therefore its output SD is at the "0" level (D in FIG. 13). However, during the period from $t_1$ to $t_6$ (when the note has passed through the position of the detector 1A), the detection output $P_A$ has an alternating current waveform at a level corresponding to the light transmissiblity of the note (A in FIG. 13), and therefore the reference level signal SD changes in a gradient substantially corresponding to the light transmissibility of the note.

Thus, whenever the note starts passing the position of the detector 1A, the reference level decision circuit 438 starts the integration operation. Thereafter, when the note has passed through the position of the detector 1A, the reference level signal SD is reset. Thus, for the period of time during which the detection point level signals $DT_A$ - $DT_C$ of the detection level decision circuits 432A - 432C are higher in level than the gradually increasing reference level signal SD the level detectors 435A - 435C produce decision outputs $D_A$ - $D_C$ at "H" levels, and in contrast when the outputs $DT_A$ - $DT_C$ are lower than the level signal SD, produce judgement outputs $D_A$ - $D_C$ at "L" levels.

The judgment outputs $D_A$ - $D_C$ thus produced are applied to a monetary denomination discriminating section 440 which comprises: a denomination reading circuit 441 which receives, as parallel code signals, the outputs of the level detectors 435A - 435C and determines the denomination of the note from the contents of the singals thus received; output gate circuits $G_{tt}$, $G_{ft}$ and $G_{ot}$ (each constituted by an AND gate) for receiving denomination signals *tt*, *ft* and *ot* representative of monetary denominations (10,000-yen, 5,000-yen and 1,000-yen in this example) read out by the denomination reading circuit 441; and a discrimination operation control circuit 442 for producing a discrimination timing pulse signal TP adapted to determine the discrimination operation timing.

As was described with reference to FIG. 11, when a note 204 arrives at the discrimination position 206, it is detected by the detector 1E disposed at the position corresponding to the front end of the note. When the detection signal $P_E$ (I in FIG. 13) of the detector 1E is applied to the discriminating operation control circuit 442, this control circuit 442 produces a discrimination timing pulse signal TP (J in FIG. 14) if the discrimination allowing signals ACC are also applied thereto.

As a first group of the discrimination allowing signals ACC, the outputs *tt* - *ot* of the denoimination reading circuit 441 are employed. When any one of the outputs *tt* - *ot* is at the "H" level, it is confirmed that the note is inserted and conveyed in the note conveying path 202. A duplication detection signal DW from a duplication detecting circuit (provided separately) is applied as a second discrimination allowing signal ACC to the discrimination operation control circuit 442 so that when a plurality of notes are inserted into the note conveying circuit 202, the discrimination operation is not carried out. A circuit similar to duplicating detection circuit 113 (illustrated in FIGS. 8 and 9) could be employed here. Furthermore, discrimination signals JA, JB and JC respectively from a magnetic characteristic discriminator, a dimensional characteristic discriminator, and a color characteristic discriminator (not shown) provided in the note conveying path 202 are applied as a third group of the discrimination allowing signals ACC to the discrimination operation control circuit 442, so that the control circuit 442 produces a discrimination timing pulse signal TP when the other discrimination conditions with respect to these discriminating factors of the note are satisfied.

The discrimination timing pulse signal TP is applied, as an open control signal, to the output gate circuits $G_{tt}$ - $G_{ot}$, as a result of which the denomination signals *tt* - *ot* applied to the output circuits $G_{tt}$ - $G_{ot}$ are delivered as discrimination result outputs JG.

Before the $t_1$ (FIG. 13) all the output levels of the detectors 1A - 1C are at the "O" level (A - C in FIG. 13), and therefore the level of the outputs SD of the decision circuit 438 is also at the "O" level (D in FIG. 13); since the detection level decision circuits 432A - 432C are reset, the outputs of these circuits 432A - 432C are at the "O" level, and therefore the level detectors 435A - 435C produce the outputs at the "L" level.

When the note passes through the position of the detector 1A at time $t_1$ the detection signal $P_A$ of the detector 1A is lowered to the detection level, and this is integrated by the decision circuit 438, and accordingly the output of the circuit 438 is gradually increased. On the other hand, the detection level decision circuits 432A - 432C are still in the reset state, and therefore the outputs thereof are at the "O" level. Accordingly, the level detectors 435A – 435C compare the reference level signal SD increasing gradually from the "O" level with the outputs of the detection level decision circuits 432A – 432C, as a result of which the level detectors 435A – 435C continue to produce judgment signals $D_A$-$D_C$ at the "L" level.

This condition is continued even as the note successively passes through the detectors 1B and 1C at the time instants $t_2$ and $t_3$.

Thereafter, when the note has reached the detector 1D at time $t_4$ and the detection output $P_D$ has been lowered from the "O" level (H in FIG. 13), the reset signal RS from the reset circuit 433 is no longer applied to the level decision circuits 432A – 432C. Therefore, these level decision circuits 432A – 432C start to integrate the detection signals $\overline{P}_A$ - $\overline{P}_C$, respectively. Accordingly, the outputs of the detection level decision circuits 432A–432C increase in gradient corresponding to the light transmissibility measured by the detectors 1A – 1C, respectively, (E, F and G in FIG. 3). If the levels of the detection point level signals $DT_A$ – $DT_C$ of the detection level decision circuits 432A – 432C become higher than the level of the output SD of the reference level decision circuit 438, the levels of the judgment outputs $D_A$ – $D_C$ of the corresponding level detectors 435A - 435C become the "H" level from the "L" level. However, during this period of time, the discrimination timing pulse signal TP is not yet produced by the discrimination operation control circuit 442, and therefore no discrimination result output JG is produced by the denomination discriminating section 440.

However, when the note reaches the detector 1E at the time instant $t_5$, a detection signal $P_E$ (as shown in I of FIG. 13) is produced by the detector 1E, whereby the discrimination operation control circuit 442 delivers the discrimination timing signal TP (J in FIG. 13) at the time instant $t_5$, and at the same time the denomination signal *tt, ft* or *or* read by the denomination reading circuit 441 are delivered, as the decision result output JG, through the output gate circuit $G_{tt}$, $G_{ft}$ or $G_{ot}$.

At this time, the note is at the note discrimination position 206 indicated by the dotted line in FIG. 11, and accordingly the first, second and third detectors 1A, 1B and 1C confront their respective predetermined discrimination points. Accordingly, the outputs of the detection level decision circuits 432A, 432B and 432C become the values LA, LB and LC obtained by averaging the levels corresponding to the note's light transmissibility in the regions of the note including the detection points (that is, levels obtained from the combination of stain, thickness and damage of a note).

On the other hand, the output SD of the reference level decision circuit 438 becomes a level LJ (D in FIG. 13) at the time instant $t_5$, the level LJ being a value corresponding to the stain, damage and thickness of the note.

Therefore, in the judgment outputs $D_A$ – $D_C$ of the level detectors 432A – 432C, the fluctuation in light transmissibility of the note due to the stain, damage and thickness thereof is reduced.

It should be noted that the integrations of the detection point level signals $DT_A$ – $DT_C$ of the detection level decision circuits 432A – 432C are begun at the time instant $t_4$ when the note passes through the position of the detector 1D, but the discrimination of the note is carried out at the time instant $t_5$ when the note reaches the position of the detector 1E. Therefore, the detectors 1A, 1B and 1C respectively scan scanning regions SA, SB and SC each having the length corresponding to the distance having a scanning length equal to the distance to produce their respective detection point level signals. In other words, these detection point level signals are the average values in thickness, stain and damage of the scanning regions SA, SB and SC including the discrimination points of the note, respectively.

It should be also noted that as is apparent from D in FIG. 13 the determination of the reference level necessary for determining the denominations of notes is obtained by scanning the note through a scanning length starting from the front edge of the note, whereby the reference level can be provided as the value obtained by averaging the fluctuation in characteristics of the note (that is, the fluctuation in thickness, stain and damage of the note).

As is apparent from the above description, according to the invention, the value obtained by averaging the characteristics (of thickness, stain and damage) of the note based on the scanning result obtained by scanning the note for approximately the scanning lenght is employed as the reference level, and the detection signals (affected by the characteristics of a note) from the discrimination points are subjected to comparison by employing the reference level thus determined. Therefore, even if the notes to be discriminated flucuate in characteristics such as described above, the influence on the discrimination result due to such fluctuations can be eliminated or reduced.

Furthermore, the detection output of each discrimination point is the value obtained by averaging the characteristics of the point based on the result of scanning the region including the point, and therefore the effect on the discrimination result by a slight local flucutation in the characteristics of the note can be reduced.

It may be possible to design the note discriminating apparatus body 1 so that the output of the discriminating detector produced when the note reaches the discrimination position is a detection signal obtained directly from the discrimination point. However, in this case, it is impossible to reduce the above-described effect on the discrimination result by the slight local flucuations.

In the above-described example, the integration operations of the detection level decision circuits 432A – 432C are started by the detection signal $P_D$ of the detector 1D when it is obtained. However, the integration operations may be started by the output of the reference level decision circuit 438 when the output reaches a predetermined level. In this case, the reset circuit 433 can be omitted from the detection level generating section 434 in FIG. 14, and instead of this reset circuit 433 a level detecting circuit receiving the output SD from the reference level decision circuit 38 should be provided so that the output of the level detecting circuit thus provided resets the integration circuits of the detection level decision circuits 432A – 432C or clears the integration circuits thus reset.

Furthermore, in the above-described example, the detection signal $\overline{P}_A$ applied to the detection level decision circuit 432A from the detector 1A is commonly employed as the detection input to the reference level decision circuit 438. However, in addition to this detector 1A, a special detector for reference level decision may be provided. All that is necessary in this case, is to provide the detector which can scan a note substantially for the scanning distance.

In addition, in the above-described example, the note to be discriminated is conveyed through the stationary detectors, but it is possible to design the note discriminating apparatus so that the detectors are moved.

What is claimed is:

1. A note discriminating apparatus comprising:
detector means for detecting characteristics of a bank note;
a reference level generating means receiving the output of said detector means for generating a reference level signal; and
a level detecting means receiving the output of said detector means and said reference level signal from said reference level generating means for comparing the output of said detector means with said reference level signal and for generating a note discrimination signal.

2. A note discriminating apparatus as claimed in claim 1, wherein:
said detector means includes a first detector and a plurality of second detectors;
said reference level generating means receives the output of said first detector for generating said reference level signal;
said level detecting means receives the outputs of said second detectors for comparing with said reference level signal and for generating a note discrimination signal.

3. A note discriminating apparatus as claimed in claim 2, wherein:
said level detecting means further receives the output of said first detector for comparing with said reference level signal and for generating a note discriminaion signal.

4. A note discrimination apparatus as claimed in claim 1, wherein:
said apparatus further comprises a note conveying means for moving the note relative to said detector means; said detector means includes a first detector, a plurality of second detectors and a detection level generating means receiving the outputs of said second detectors for generating detection level signals when the note is in a first predetermined position relative to said detector means;
said reference level generating means receives the output of said first detector for generating a reference level signal by averaging the output of said first detector over a predetermined scanning region as said note conveying means moves the note relative to said detector means; and
said detection level generating means receives said detection level signals and said reference level signal for comparing said detection level signals and said reference level signal and generating a note discrimination signal.

5. A note discrimination apparatus as claimed in claim 4, wherein:
said apparatus further comprises a first position detecting means when the note is in said first predetermined position relative to said detector means and a second position detecting means for detecting when the note is in a second predetermined position relative to said detector means; and
said level detecting means is connected to said first position detecting means and said second position detecting means for generating said detection level signals by averaging the outputs of said second detectors as said note conveying means moves the note from said second predetermind position to said first predetermined position.

6. A note discrimination apparatus as claimed in claim 4, wherein:
said apparatus further comprises a reference level detector means receiving said reference level signal for generating a reference threshold signal when said reference level signal reaches a predetermined level;
said detection level generating means receives said reference threshold signal for generating said detection level signals by averaging the outputs of said second detectors from when said reference threshold signal is received until said note conveying means moves the note to said first predetermined position relative to said detector means.

7. A note discrimination apparatus as claimed in claim 1, further comprising:
a note conveying path including a note inlet, a note examination position opposite said detector means and a note outlet;
a note conveying means for moving the note along said note conveying path;
a first position detecting means for detecting when the note is between said note inlet and said note examination position;
a second position detecting means for detecting when the note is in said note examination position; and
a note conveyance control means connected to said note conveying means, said first position detecting means, said second position detecting means and said level detecting means,. including an examination counting means for counting the number of times a note has been examined by said detector means, for causing said note conveying means to convey the note forward from said note examination position to said note outlet if said note discrimination signal indicates a normal note and for causing said note conveying means to convey the note back toward said note inlet if said note discrimination signal indicates an abnormal note until the note is detected by said first position detecting means whereupon said note is conveyed to said note examination position again if the count of said examination counting means is less than a predetermined value and said note is conveyed back out said note inlet if the count of said examination counting means is not less than said predetermined value.

8. A note discriminating apparatus as claimed in claim 7, wherein:
said apparatus further comprises a third position detecting means for detecting when the note reaches said note outlet; and
said note conveyance control means is further connected to said third position detecting means and further includes a first timing means receiving the outputs of said first, second and third position detecting means for causing said note conveying means to convey the note back along the note conveying path when more than a first predetermined length of time passes after the note is detected by one of said position detecting means before passing the next of said position detecting means and still further includes a second timing means connected to said first timing means, and said first position detecting means for suspending the movement of the note by said note conveying means and producing an alarm signal when more than a second predetermined length of time passes after the reversal of the note travel by said first timer means before the note is detected by said first position detecting means.

9. A note discrimination apparatus comprising:

a note examing means for detecting characteristics of a bank note, for determining from said detected characteristics whether the note examined is a true note and for generating a note discrimination signal which indicates whether the note examined is a true note;

a note conveying path including a note inlet, a note examination position related to said note examining means and a note outlet;

a note conveying means for moving the note along said note conveying path;

a first position detecting means for detecting when the note is between said note inlet and said note examination position;

a second position detecting means for detecting when the note is in said note examination position; and a note conveyance control means connected to said note conveying means, said first position detecting means, said second position detecting means and said note examining means, including an examination counting means for counting the number of times a note has been examined by said note examining means, for causing said note conveying means to convey the note forward from said note examination position to said note outlet if said note discrimination signal indicates a true note and for causing said note conveying means to convey the note back toward said note inlet if said note discrimination signal indicates a false note until the note is detected by said first position detecting means whereupon said note is conveyed to said note examination position again if the count of said examination counting means is less than a predetermined value and said note is conveyed back out said note inlet if the count of said examination counting means is not less than said predetermined value.

10. A note discriminating apparatus as claimed in claim 9, wherein:

said apparatus further comprises a third position detecting means for detecting when the note reaches said note outlet; and said note conveyance control means is further connected to said third position detecting means and further includes a first timing means connected to said first, second and third position detecting means for causing said note conveying means to convey the note back along the note conveying path when more than a first predetermined length of time passes after the note is detected by one of said position detecting means before passing the next of said position detecting means, and still further includes a second timing means connected to said first timing means and said first position detecting means for asuspending the movement of the note by said note conveying means and producing an alarm signal when more than a second predetermined length of time passes after the reversal of the note travel by said first timing means before the note is detected by said first position detecting means.

* * * * *